United States Patent
Palys et al.

(10) Patent No.: US 11,203,672 B2
(45) Date of Patent: Dec. 21, 2021

(54) EFFICIENT CURATIVE FOR FREE RADICALLY-CROSSLINKABLE POLYMERS

(71) Applicant: Arkema Inc., King of Prussia, PA (US)

(72) Inventors: Leonard H. Palys, Downingtown, PA (US); Marina Despotopoulou, Havertown, PA (US); Peter R. Dluzneski, Harleysville, PA (US)

(73) Assignee: Arkema Inc., King of Prussia, PA (US)

( * ) Notice: Subject to any disclaimer, the term of this patent is extended or adjusted under 35 U.S.C. 154(b) by 202 days.

(21) Appl. No.: 16/465,158

(22) PCT Filed: Dec. 14, 2017

(86) PCT No.: PCT/US2017/066398
§ 371 (c)(1),
(2) Date: May 30, 2019

(87) PCT Pub. No.: WO2018/118641
PCT Pub. Date: Jun. 28, 2018

(65) Prior Publication Data
US 2019/0338086 A1 Nov. 7, 2019

Related U.S. Application Data

(60) Provisional application No. 62/436,507, filed on Dec. 20, 2016.

(51) Int. Cl.
| | |
|---|---|
| C08J 3/24 | (2006.01) |
| B29C 41/00 | (2006.01) |
| C08F 10/02 | (2006.01) |
| B29C 41/04 | (2006.01) |
| B29K 105/24 | (2006.01) |

(52) U.S. Cl.
CPC ............... *C08J 3/24* (2013.01); *B29C 41/003* (2013.01); *C08F 10/02* (2013.01); *C08J 3/242* (2013.01); *B29C 41/04* (2013.01); *B29K 2023/06* (2013.01); *B29K 2105/24* (2013.01); *C08F 2810/20* (2013.01)

(58) Field of Classification Search
CPC ...... C07C 409/16; C07C 50/00; C07D 211/94; C08K 5/14; C08K 5/08; C08K 5/005; C08K 5/32
See application file for complete search history.

(56) References Cited

U.S. PATENT DOCUMENTS

| | | | |
|---|---|---|---|
| 4,526,916 A | 7/1985 | White | |
| 4,855,428 A * | 8/1989 | Verlaan | C07D 251/34 544/219 |
| 5,245,084 A * | 9/1993 | Groepper | C08F 291/00 526/226 |
| 5,292,791 A | 3/1994 | Groepper et al. | |
| 5,494,988 A | 2/1996 | Sanchez et al. | |
| 6,277,925 B1 | 8/2001 | Biswas et al. | |
| 6,555,019 B2 | 4/2003 | Palys et al. | |
| 2004/0180985 A1 | 9/2004 | Novits et al. | |
| 2004/0249097 A1 | 12/2004 | Cozens et al. | |
| 2006/0036038 A1 | 2/2006 | Cook et al. | |
| 2007/0023716 A1 | 2/2007 | Van Der Burgt et al. | |
| 2012/0241158 A1* | 9/2012 | Seshadri | C09K 8/70 166/308.1 |
| 2016/0272781 A1 | 9/2016 | Palys | |

FOREIGN PATENT DOCUMENTS

| | | | |
|---|---|---|---|
| WO | WO 2015/069455 | * | 5/2015 |
| WO | WO 2016/055959 A1 | | 4/2016 |
| WO | WO 2016/094163 A1 | | 6/2016 |
| WO | WO 2016/094200 A1 | | 6/2016 |

* cited by examiner

*Primary Examiner* — Robert C Boyle
(74) *Attorney, Agent, or Firm* — Lynn B. Morreale

(57) ABSTRACT

An organic peroxide composition is provided which is liquid or near liquid at 25° C. or a low melting solid and which includes at least one ethylenically unsaturated organic peroxide (i.e., an organic peroxide containing at least one carbon-carbon double bond) and at least one saturated organic peroxide. The organic peroxide composition may further include at least one mono- and/or poly-unsaturated compound and at least one free-radical trap. The organic peroxide can be blended into a polymer such as a powdered or granular polyethylene resin. This peroxide-containing polymer can be used in rotational molding, wherein the polymer is added to a mold which is heated in an oven with rotation, thereby melting the polymer and coating the inside of the mold.

17 Claims, 1 Drawing Sheet

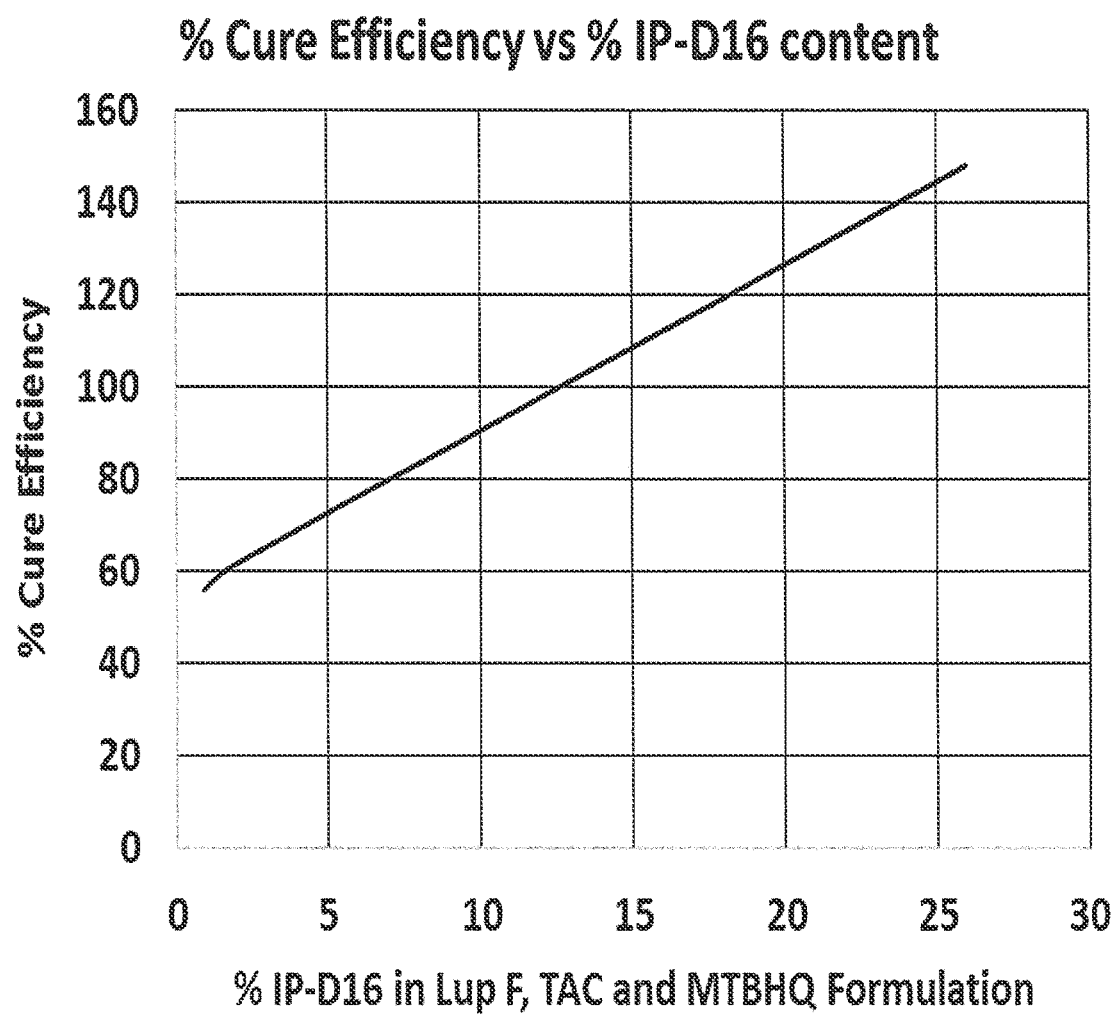

US 11,203,672 B2

EFFICIENT CURATIVE FOR FREE RADICALLY-CROSSLINKABLE POLYMERS

This application is a national stage application under 35 U.S.C. § 371 of PCT/US2017/066398 filed Dec. 14, 2017, which claims benefit to U.S. patent application Ser. No. 62/436,507, filed Dec. 20, 2016.

FIELD OF THE INVENTION

The invention relates to organic peroxide compositions that are liquid or near liquid at room temperature or are low temperature-melting solids and that are useful curatives for polymers capable of being crosslinked by free radical means.

BACKGROUND OF THE INVENTION

Thermoplastic polymers and elastomers are crosslinked with free radical crosslinking agents or initiators, such as organic peroxides, to improve physical and mechanical properties such as low temperature impact, chemical resistance, and heat deformation resistance. In particular, an organic peroxide 2,5-dimethyl-2,5-di(tert-butyl peroxy) hexyne-3 (known as "DYBP") may be used with a triallyl cyanurate crosslinking coagent for the rotomolding of crosslinked high density polyethylene (HDPE). This acetylenic-(triple bond) containing dialkyl peroxide provides beneficial long scorch times during polymer compounding and processing. However, it also has the disadvantage of long cure cycles and requires use of aggressively higher temperatures. This may result in a decrease of cure efficiency, productivity and/or part quality. Furthermore, certain DYBP formulations (e.g., 86+ %) may impart greater risks to use and transport than other organic peroxides. While DYBP itself is not a skin irritant, the resulting gaseous and liquid acetylenic decomposition by-products are known primary skin irritants that remain on or in the finished product.

Thus, there is a need for an improved stable organic peroxide formulation that is liquid or near liquid at room temperature and safer than a DYBP-based formulation, with adequate scorch times (i.e. a long onset time prior to cure at elevated temperatures) and shorter cure times for improved productivity without excessive high cure temperatures. At the same time, such a formulation should provide good air and skin hygiene and safety, and minimal gaseous and safer decomposition-by products.

DISCUSSION OF THE RELATED ART

Organic peroxide-containing formulations useful for crosslinking various polymers have been described.

WO2016/055959A1 discloses the use of DYBP and similar saturated derivatives of DYBP along with the use of triallyl cyanurate and triallyl isocyanurate as crosslinking coagent.

US 2007/023716A1 discloses polyethylene resins mixed with peroxide selected from t-butyl peroxide and t-amyl peroxide types used in the range of 5 ppm to 200 ppm.

U.S. Pat. No. 6,277,925 B1 discloses curable polymer compositions comprising a crosslinkable polymeric component, an initiator component, and an allyl component.

U.S. Pat. No. 5,494,988 discloses the use of several unsaturated peroxide compositions for polymerization reactions and for crosslinking polyolefins, which may or may not involve solvents or other components.

U.S. Pat. No. 4,855,428 discloses organic peroxides having at least one carbon-carbon double bond, e.g., 2-t-amylperoxy-4,6-diallyloxy-1,3,5-triazine, and the use of such organic peroxides as crosslinking agents for polymers.

U.S. Pat. No. 5,245,084 discloses the use of an organic peroxide, a hydroquinone derivative as a scorch retarder additive and allylic crosslinking coagents.

U.S. Pat. No. 6,555,019 discloses sulfur-free, crosslinking, scorch-retarding compositions for the compounding and curing of polymers susceptible to cure by free radical initiators, containing organic peroxides, hydroquinone mono-alkyl or mono-aryl ethers, and crosslinkage promoters.

U.S. Pat. No. 4,526,916 discloses compositions adapted for use in a rotational molding process, comprising polyethylene, a bis(tert-alkyl peroxyalkyl)benzene, a co-curing agent such as triallyl cyanurate, a hindered phenolic antioxidant, and a secondary antioxidant.

SUMMARY OF THE INVENTION

Peroxide compositions of the present invention are capable of being used to efficiently cure (crosslink) polymers, thereby providing enhanced scorch performance at cure temperatures, good air and skin hygiene due to reduced or no harmful gaseous decomposition by-products, low odor, and/or reduced porosity of the crosslinked polymer with faster cures at lower cure temperatures. Aspects of the present invention include peroxide compositions, methods of making such compositions, and methods of using the same.

According to an embodiment of the present invention, an organic peroxide composition comprises at least one ethylenically unsaturated organic peroxide (that is, an organic peroxide containing at least one carbon-carbon double bond, preferably one that is free radically-reactive; such a peroxide is referred to herein as an "ethylenically unsaturated organic peroxide" or "unsaturated organic peroxide") and at least one saturated organic peroxide (i.e. an organic peroxide that does not contain any ethylenic unsaturation). In an exemplary embodiment, the organic peroxide composition is a liquid or near liquid at room temperature (25° C.). The at least one ethylenically unsaturated organic peroxide may be a monomeric organic peroxide. As used herein, the term. "monomeric", when referring to an organic peroxide, means the organic peroxide includes at least one moiety containing at least one free radically-reactive carbon-carbon double bond that becomes bound to the polymer matrix upon curing of a polymer using a peroxide composition comprising such a monomeric organic peroxide. The at least one ethylenically unsaturated organic peroxide may be a dialkyl organic peroxide. As used herein, the term "dialkyl" when referring to an organic peroxide means that each oxygen of the —O—O— peroxy moiety or moieties present in the organic peroxide is bonded to a paraffinic (alkane) carbon atom. The paraffinic carbon atoms bonded to the peroxy oxygen atoms are preferably tertiary. 1-(2-Tert-butylperoxyisopropyl)-3-isopropenylbenzene is an example of a monomeric, dialkyl, ethylenically unsaturated organic peroxide suitable for use in the present invention. The carbon-carbon double bond(s) present in the ethylenically unsaturated organic peroxide is or are preferably reactive, that is, it or they is or are capable of participating in a free radical-catalyzed reaction or polymerization or grafting onto a polymer (e.g., polyethylene) backbone. The ethylenically unsaturated organic peroxide(s) and saturated organic peroxide(s) are present in the organic peroxide composition in amounts effective to provide a weight ratio of ethylenically unsaturated organic peroxide:saturated peroxide of from 0.5:9.5 to 9.5:0.5 (in other embodiments, from 1:9 to 9:1, from 1:4 to 4:1, from 1:3 to 3:1, or from 1:2 to 2:1). In various embodiments of the invention, the amount of ethylenically unsaturated organic peroxide may be from 5 to 95%, 10% to 90%, 20% to 80%, 25% to 75%, 30% to 70%, 35% to 65% or 40% to 60% by weight, based on the total weight of ethylenically unsaturated organic peroxide and saturated organic peroxide in the organic peroxide composition.

According to another embodiment of the present invention, an organic peroxide composition comprises at least one ethylenically unsaturated organic peroxide, at least one saturated organic peroxide, at least one mono- and/or poly-unsaturated compound (crosslinking coagent), at least one free-radical trap compound and at least one reactive ethylenically unsaturated deodorant compound (which is different from the crosslinking coagent). The carbon-carbon double bond functionalities of the ethylenically unsaturated organic peroxide and the deodorant compound preferably are reactive, that is, they are capable of participating in a free radical-catalyzed or -initiated reaction or polymerization or grafting onto a polymer (e.g., polyethylene) backbone.

According to another embodiment of the present invention, an organic peroxide composition comprises 0.5-60% by weight ethylenically unsaturated organic peroxide; 5-60% by weight saturated organic peroxide; 0.1-30% by weight free radical trap; and 20-80% by weight mono- or poly-unsaturated compound (in addition to ethylenically unsaturated organic peroxide).

According to another embodiment of the present invention, a method of making an organic peroxide composition comprises mixing at least one ethylenically unsaturated organic peroxide, at least one saturated organic peroxide, optionally, at least one free radical trap compound, and, optionally, at least one mono- and/or poly-unsaturated compound.

According to another embodiment of the present invention, a method of forming a crosslinked polymer comprises processing a polymer or polymer precursor in the presence of an organic peroxide composition, wherein the organic peroxide composition comprises at least one ethylenically unsaturated organic peroxide, at least one saturated organic peroxide, and, optionally, at least one free radical trap compound, and, optionally, at least one mono- or poly-unsaturated compound to form a crosslinked polymer. Such processing typically is carried out at a temperature effective to effectively initiate decomposition of organic peroxide. For example, the processing may include rotomolding a polymer, in particular a polyolefin such as polyethylene (e.g. HDPE).

According to another embodiment of the present invention, a method of forming a crosslinked polymer comprises processing a polymer or polymer precursor in the presence of an organic peroxide composition, which comprises at least one ethylenically unsaturated organic peroxide, at least one saturated organic peroxide, at least one free radical trap compound, and at least one mono- and/or poly-unsaturated compound to form a crosslinked polymer. For example, the processing may include rotomolding a polymer, in particular a polyolefin such as polyethylene (e.g. HDPE).

Various aspects of the present invention may be summarized as follows:

Aspect 1: An organic peroxide composition comprising, consisting essentially of or consisting of at least one ethylenically unsaturated organic peroxide and at least one saturated organic peroxide, having a weight ratio of ethylenically unsaturated organic peroxide to saturated organic peroxide of from 1:9 to 9:1, from 1:5 to 5:1, from 4:1 to 1:4, from 3:1 to 1:3, or from 2:1 to 1:2.

Aspect 2: The organic peroxide composition according to Aspect 1, wherein the at least one ethylenically unsaturated organic peroxide comprises, consists essentially of or consists of a monomeric ethylenically unsaturated organic peroxide.

Aspect 3: The organic peroxide composition according to Aspect 1 or 2, wherein the at least one ethylenically unsaturated organic peroxide comprises, consists essentially of or consists of at least one dialkyl peroxide.

Aspect 4: The organic peroxide composition according to any of Aspects 1-3, wherein the at least one ethylenically unsaturated organic peroxide comprises, consists essentially of or consists of at least one ethylenically unsaturated organic peroxide comprising at least one moiety selected from the group consisting of isopropenyl moieties, (meth)acrylate moieties, fumarate moieties, maleate moieties, and itaconate moieties.

Aspect 5: The organic peroxide composition according to any of Aspects 1-4, additionally comprising, consisting essentially of or consisting of i) at least one free radically-reactive mono- or poly-unsaturated compound, other than an ethylenically unsaturated organic peroxide, that contains at least one carbon-carbon double bond and ii) at least one free radical trap compound. As used herein, the term "mono-unsaturated compound" means a compound containing a single carbon-carbon double bond and the term "poly-unsaturated compound" means a compound containing two or more carbon-carbon double bonds (including di-unsaturated compounds and tri-unsaturated compounds as well as more highly unsaturated compounds).

Aspect 6: The organic peroxide composition according to Aspect 5 where the at least one free radically-reactive mono- or poly-unsaturated compound is selected from the group consisting of deodorant compounds and crosslinking coagents.

Aspect 7: The organic peroxide composition according to Aspect 5 or 6, wherein the at least one free radical trap compound is selected from the group consisting of nitroxides, quinone compounds, hindered phenol antioxidant radical scavengers, bioflavonoids, and combinations thereof.

Aspect 8: The organic peroxide composition, according to any of Aspects 5-7, wherein the at least one free-radically reactive mono or poly-unsaturated compound is selected from the group consisting of alpha-pinene, beta-pinene, eugenol, limonene, jasmonic acid, orange oil components, lemon oil components, jasmine oil components, rose oil components, lilac oil components, violet oil components, clove oil components, hyacinth oil components, lily oil components, rose oil components, triallyl cyanurate, triallyl isocyanurate, and combinations thereof.

Aspect 9: The organic peroxide composition according to any of Aspects 1-8, wherein the at least one saturated organic peroxide is selected from the group consisting of saturated dialkyl peroxides, saturated endo peroxides, and combinations thereof.

Aspect 10: The organic peroxide composition according to any of Aspects 1-9, wherein the at least one saturated organic peroxide comprises, consists essentially of or consists of an aryl-containing saturated dialkyl peroxide.

Aspect 11: The organic peroxide composition according to any of Aspects 1-10, wherein the organic peroxide composition is liquid or near liquid at room temperature or a low melting solid.

Aspect 12: The organic peroxide composition according to any of Aspects 1-11, wherein the at least one ethylenically unsaturated organic peroxide comprises, consists essentially of or consists of at least one ethylenically unsaturated organic peroxide containing at least one isopropenyl group attached to an aromatic ring.

Aspect 13: An organic peroxide composition comprising, consisting essentially of or consisting of:
  one or more ethylenically unsaturated organic peroxides;
  one or more saturated organic peroxides;
  one or more free radical traps; and
  one or more mono- or poly-unsaturated compounds other than ethylenically unsaturated organic peroxide;
having a weight ratio of ethylenically unsaturated organic peroxide to saturated organic peroxide of from 0.5:9.5 to 9.5:0.5, from 1:9 to 9:1, from 1:5 to 5:1, from 4:1 to 1:4, from 3:1 to 1:3, or from 2:1 to 1:2.

Aspect 14: The organic peroxide composition according to Aspect 13, wherein the organic peroxide composition is a liquid or near liquid at room temperature or a low melting solid and the one or more ethylenically unsaturated organic peroxides comprise, consist essentially of or consist of 1-(2-tert-butylperoxyisopropyl)-3-isopropenylbenzene, the one or more saturated organic peroxides are selected from the group consisting of m/p-di(t-butylperoxy)diisopropyl-benzene, t-butylcumyl peroxide, 2,5-dimethyl-2,5-di(t-butylperoxy)hexane and combinations thereof, the one or more free radical traps are selected from the group consisting of 4-hydroxy TEMPO, mono-tert-butyl hydroquinone (MTBHQ) and HQMME (hydroquinone, monomethylether) and combinations thereof, and the one or more mono- or poly-unsaturated compounds are selected from the group consisting of alpha-pinene, beta-pinene, eugenol, limonene, jasmonic acid, triallyl cyanurate, triallyl isocyanurate, orange oil components, lemon oil components, jasmine oil components, rose oil components, and combinations thereof.

Aspect 15: The organic peroxide composition according to Aspect 13, wherein the organic peroxide composition is a liquid or near liquid at room temperature or a low melting solid, the one or more ethylenically unsaturated organic peroxides comprise, consist essentially of or consist of 1-(2-tert-butylperoxyisopropyl)-3-isopropenylbenzene, the one or more saturated organic peroxides comprise, consist essentially of or consist of m/p-di(t-butylperoxy)diisopropyl-benzene, the one or more free radical traps comprise, consist essentially of or consist of mono-tert-butyl hydroquinone (MTBHQ), and the one or more mono- or poly-unsaturated compounds comprise, consist essentially of or consist of triallyl cyanurate.

Aspect 16: The organic peroxide composition according to Aspect 13, wherein the organic peroxide composition comprises, consists essentially of or consists of:
  0.5-60% by weight in total of one or more ethylenically unsaturated organic peroxides;
  5-60% by weight in total of one or more saturated organic peroxides;
  0.1-15% by weight in total of one or more free radical traps; and
  20-80% by weight in total of one or more mono- or poly-unsaturated compounds other than ethylenically unsaturated organic peroxide.

Aspect 17: A method of making an organic peroxide composition comprising: mixing at least one ethylenically unsaturated organic peroxide, at least one saturated organic peroxide, at least one free radical trap compound, and at least one mono- or poly-unsaturated compound, wherein an amount of ethylenically unsaturated organic peroxide and an amount of saturated organic peroxide are used which are effective to provide a weight ratio of ethylenically unsaturated organic peroxide to saturated organic peroxide of from 1:9 to 9:1, from 1:5 to 5:1, from 4:1 to 1:4, from 3:1 to 1:3, or from 2:1 to 1:2.

Aspect 18: The method of making an organic peroxide composition according to Aspect 17 further comprising applying the organic peroxide composition to an inert filler or polymer.

Aspect 19: A method of forming a crosslinked polymer comprising processing a polymer or polymer precursor in the presence of an organic peroxide composition in accordance with any of Aspects 1-16 to form the crosslinked polymer.

Aspect 20: The method of forming a crosslinked polymer according to Aspect 19, wherein the crosslinked polymer is crosslinked polyethylene.

Aspect 21: The method of forming a crosslinked polymer according to Aspect 20, wherein the crosslinked polyethylene is selected from the group consisting of crosslinked high density polyethylene (HDPE), crosslinked medium density (MDPE), crosslinked low density polyethylene (LDPE), crosslinked linear low density polyethylene (LLDPE), crosslinked polyethylene blends, crosslinked polyethylene copolymers, crosslinked polyethylene terpolymers and combinations thereof.

Aspect 22: The method of forming a crosslinked polymer according to any of Aspects 19-21, wherein the processing comprises a rotomolding process.

Aspect 23: The method of forming a crosslinked polymer according to any of Aspects 19-22, wherein a monomeric portion of the at least one ethylenically unsaturated organic peroxide is incorporated into the crosslinked polymer.

BRIEF DESCRIPTION OF THE DRAWING

The FIGURE depicts a trend of higher percentage cure efficiency when increasing the IP-D16 concentration in formulations of the invention using data from Examples 1 and 2.

DETAILED DESCRIPTION OF THE INVENTION

Aspects of the present invention include peroxide compositions, methods of making the peroxide compositions, and methods of using the peroxide compositions to crosslink polymers. The peroxide compositions may be used to crosslink free radically-crosslinkable polymers (e.g., any polymer capable of crosslinking through free radical mechanisms).

As used herein, the terms "peroxide composition" and "organic peroxide composition" may be used interchangeably to refer to the invention.

Reference to the term "polymer" herein may include all free radically-crosslinkable thermoplastic type polymers, elastomers, copolymers, terpolymers, polyolefins, and homopolymers (e.g., polyethylene).

According to one aspect of the invention, an organic peroxide composition includes at least one ethylenically unsaturated organic peroxide (that is, an organic peroxide containing at least one carbon-carbon double bond) and at least one "saturated" organic peroxide. The term "saturated" organic peroxide as used herein refers to a peroxide which does not contain a reactive (polymerizable) C=C double bond. Alkyne-containing peroxides such as DYBP are considered "saturated" because the C≡C triple bond does not participate in polymerization reactions as do organic peroxides containing C=C double bonds, which can add or bind to a free-radical present on a polymer chain. However, in one embodiment, the organic peroxide composition of the present invention is free or essentially free of any alkyne-containing peroxide.

The phrase "ethylenically unsaturated organic peroxide" as used herein is intended to encompass organic peroxides that contain one or more carbon-carbon double bond functional groups per molecule that are capable of reacting with free radical crosslinkable polymers. The ethylenically unsaturated organic peroxide(s) contain at least two adjacent carbon atoms linked by two bonds (e.g., an unsaturated group) and may be classified as peroxide-containing mono-olefins or alkenes (i.e., having an organo group which is a straight- or branched-chain hydrocarbon with one double bond), cyclo-olefins or cycloalkenes (i.e., having an organo group which is a cyclic hydrocarbon ring with one double bond), or diolefins or diener (i.e., having two organo groups each of which contains a carbon-carbon double bond or a single organo group containing two carbon-carbon double bonds), or the like.

Any suitable ethylenically unsaturated organic peroxide or combination of ethylenically unsaturated organic peroxides may be selected by one skilled in the art, based on the description of the invention provided herein. For example, the at least one carbon-carbon double bond may be furnished by at least one isopropenyl group attached to an aromatic ring or a tert-butylperoxy or tert-amylperoxy group. The at least one tert-butylperoxy or tert-amylperoxy group may be bonded to a tertiary carbon atom. In one embodiment, the tertiary carbon atom may be bonded to two alkyl (e.g., methyl) groups and an aryl (e.g., phenyl or substituted phenyl) group.

The at least one ethylenically unsaturated organic peroxide may be a monomeric dialkyl ethylenically unsaturated organic peroxide. The term "monomeric" peroxide refers to an organic peroxide containing at least one ethylenically unsaturated group capable of reacting with polymeric free radicals, e.g., HDPE polymeric free radicals. The monomeric portion of the organic peroxide may become incorporated into the crosslinked network, while also contributing to increased crosslinking of the polymer.

Without wishing to be bound to any particular theory, it is believed that ethylenically unsaturated organic peroxides surprisingly reduce porosity in the crosslinked polymers obtained in accordance with the present invention, especially during a rotational molding process, while also providing an unexpected beneficial increase in scorch time with an unexpected minimal change in cure time. This novel combination of desirable results improves the overall crosslinking efficiency, part quality and worker safety.

In contrast, the use of saturated peroxides (e.g., DYBP) with poly-unsaturated coagent compounds, as described in the art, for the rotational molding of crosslinked HDPE generates larger quantities of low molecular weight gaseous by-products, which are believed to contribute to undesirable porosity and require higher cure temperatures and longer cure times. Porosity is a very common problem in the rotomolding industry as it weakens the final structure of a formed crosslinked part and is considered a major defect.

The novel application of monomeric ethylenically unsaturated peroxides in the rotational molding process, in accordance with the present invention, provides longer scorch times for improved polymer flow in the closed mold prior to crosslinking, while minimizing cure time and permit lower temperature cure profiles so as not to degrade or discolor the polyolefin (HDPE) part. In summary, this leads to improved productivity, less scrap and a higher quality finished part of better color and with fewer issues in regard to air and skin hygiene due to the polymer bound by-products.

As used herein, "dialkyl type peroxides," "dialkyl peroxide class," or "dialkyl peroxides" may be used interchangeably to define a peroxide comprising a dialkyl structure. In particular, an organic peroxide possesses one or more oxygen-oxygen bonds (R—OO—R') with both R and R' being organic groups. In a dialkyl peroxide, R and R' may be the same or different and are both alkyl groups (i.e., $C_nH_{2n+1}$), such as methyl, ethyl, propyl, butyl, pentyl, etc. or substituted alkyl groups (wherein the alkyl group may be substituted with other types of groups, including aryl groups). In preferred embodiments, each carbon atom bonded to an oxygen of an oxygen-oxygen peroxy moiety in the dialkyl organic peroxide is a tertiary carbon atom.

The dialkyl peroxides may also contain other groups in addition to the alkyl groups discussed above, such as aryl groups, additional alkyl groups, aryl alkyl groups, endo groups, acrylate groups, allylic groups, diallylic groups, triallylic groups, di(meth)acrylate groups, (meth)acrylate groups, fumarate groups, maleate groups, itaconate groups, and the like.

In one embodiment, the dialkyl peroxide may be an aryl-containing dialkyl peroxide (i.e., at least one aryl group, such as a phenyl, benzyl, or tolyl group, derived from an aromatic ring, is present in the organic group R and/or R').

Suitable ethylenically unsaturated organic peroxides include compounds containing at least one peroxy group (—O—O—) and at least one organo group containing at least one carbon-carbon double bond. The organo group may, for example, be a hydrocarbyl group such as an allyl or isopropenyl group (which may, in one embodiment, be a substituent on an aromatic group, such as a benzene ring). The organo group may also be, for example, an alpha,beta-unsaturated ester group such as an acrylate, methacrylate, fumarate, itaconate or maleate group.

Any suitable ethylenically unsaturated organic peroxide may be selected. Suitable ethylenically unsaturated organic peroxides may include, for example, 1-(2-tert-butylperoxy-isopropyl)-3-isopropenylbenzene [also known as tert-butyl-3-isopropenylcumyl peroxide or m-isopropenylcumyl tert-butyl peroxide]; 1-(2-tert-butylperoxyisopropyl)-4-isopropenylbenzene; 1-(2-tert-butylperoxyisopropyl)-3,4-diisopropenylbenzene; 1,3-di(tert-butylperoxy) diisopropylbenzene-5-isopropenyl; 1,4-di(tert-butylperoxy) diisopropylbenzene-2-isopropenyl; 1-(2-tert-amylperoxyisopropyl)-3-isopropenylbenzene; 1-(2-tert-amylperoxyisopropyl)-4-isopropenylbenzene; 1-(2-tert-amylperoxyisopropyl)-3,4-diisopropenylbenzene; 1,3-dimethyl-3-(t-butylperoxy)butyl N{1[3(1-methylethenyl)phenyl} 1-methylethyl]carbamate; 2,4-diallyloxy-6-tert-butylperoxide-1,3,5-triazine; 1,3-dimethyl-3-(t-butylperoxy) butyl methacrylate; 1,3-dimethyl-3-(t-butylperoxy) butyl acrylate; 3-methyl-3(t-butylperoxy) butyl methacrylate; 3-methyl-3(t-butylperoxy)butyl acrylate; di-[1,3-dimethyl-3-(t-amylperoxy)butyl] fumarate; di-[1,3-dimethyl-3-(t-butylperoxy)butyl] fumarate; ethyl-1,3-dimethyl-3-(t-butylperoxy)butyl fumarate; 1,3-dimethyl-3-(t-butylperoxy) butyl itaconate; 1,3-dimethyl-3-(t-butylperoxy)butyl maleate; ethyl-1,3-dimethyl-3-(t-butylperoxy)butyl itaconate; di[1,3-dimethyl-3-(t-butylperoxy)butyl]itaconate; and mixtures thereof.

The most preferred ethylenically unsaturated peroxide used in the practice of this present invention is 1-(2-tert-butylperoxyisopropyl)-3-isopropenylbenzene, sometimes also referred to herein as IP-D16. Using this ethylenically unsaturated peroxide, it is possible (as demonstrated in the Examples) to obtain unexpectedly improved crosslinking efficiency when used in blends with a more preferred saturated organic peroxide, m/p-di-tert-butylperoxydiisopropyl-benzene, a more preferred crosslinking coagent TAC and/or a more preferred free-radical trap MTBHQ, and/or when all of these are blended into an HDPE polymer. This combination of peroxide curatives and other components blended into polyethylene was found to result in an unexpected desirable combination of improved degree of crosslinking of the polyethylene, desirable cure time and scorch time protection that provided overall increased crosslinking efficiency for a rotational molding process.

The structure below represents ethylenically unsaturated peroxides such as 1,3-dimethyl-3(t-butylperoxy)butyl methacrylate; 1,3-dimethyl-3(t-butylperoxy)butyl acrylate and other alkylacrylates where the substituent attached to the alpha carbon of the C=C moiety could be H, CH$_3$, or a longer chain alkyl group.

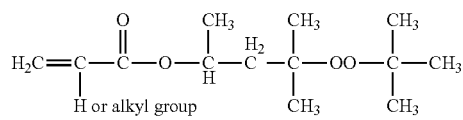

The structure below is an ethylenically unsaturated organic peroxide Whose chemical name is 1,3-dimethyl-3-(t-butylperoxy)butyl itaconate. The acid functionality imparts improved paintability to crosslinked polyolefin (e.g., HDPE) part.

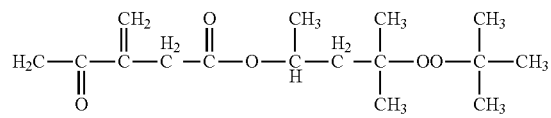

Di[1,3-dimethyl-3-(t-butylperoxy)butyl] itaconate, the structure of which is shown below, is another suitable ethylenically unsaturated organic peroxide.

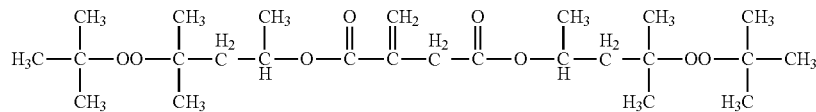

In an exemplary embodiment, the ethylenically unsaturated organic peroxide is 1-(2-tert-butylperoxyisopropyl-3-isopropenylbenzene (IP-D16; chemical structure shown below). IP-D16 is considered to be an ethylenically unsaturated organic peroxide which is both a dialkyl organic peroxide and a monomeric organic peroxide. In comparison, the peroxide D16 (structure shown below) is considered a dialkyl organic peroxide, but does not contain a monomeric portion (i.e., a portion containing a carbon-carbon double bond capable of participating in reactions during crosslinking of a polymer) so is classified as a "saturated" organic peroxide.

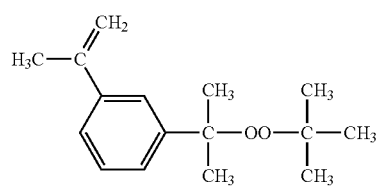

(IP-D16)

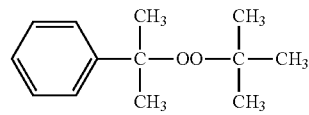

(D16)

Another suitable "saturated" organic peroxide is m/p-di (t-butylperoxy)diisopropyl benzene sold, for example, under the brand name Luperox® F by Arkema Inc. Suitable peroxide may be present as the pure meta isomer, pure para isomer, or a mixture of the two isomers.

In an exemplary embodiment, the saturated organic peroxide is m/p-di-tert-butylperoxydiisopropylbenzene. The structures of the meta- and para-isomers may be represented as follows:

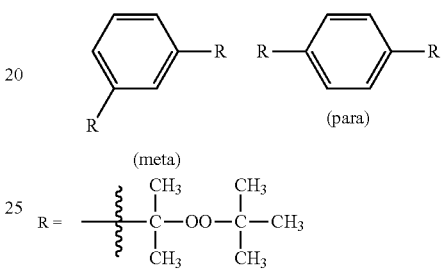

The organic peroxide composition includes at least one saturated organic peroxide. The saturated organic peroxide is deemed "saturated" because it does not include any organic peroxides which possess polymerizable carbon-carbon double bonds, but may include non-polymerizable triple bonds, as in the case of the peroxide DYBP. The "saturated" organic peroxides may include saturated dialkyl peroxides, saturated endo peroxides, and mixtures thereof, for example.

Saturated dialkyl organic peroxides may include any organic peroxide that does not contain any carbon-carbon double bonds but that does possess one or more oxygen-oxygen bonds such as those corresponding to the general formula R—OO—R', where R and R' are the same or different and are selected from primary, secondary, or preferably tertiary alkyl, cycloalkyl, and aralkyl hydrocarbon or hetero-substituted hydrocarbon radicals as taught in the Kirk-Othmer Encyclopedia of Chemical Technology, Fourth Edition, Volume 18, 1996, pages 240-253, "Organic Peroxides" by Jose Sanchez and Terry N. Myers.

Saturated endo peroxides may include any cyclic peroxides (i.e., the oxygen-oxygen bond is contained in the cyclic portion of the peroxide molecule, as exemplified below) which are free of ethylenic unsaturation.

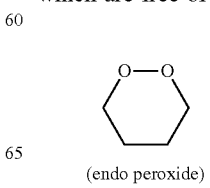

(endo peroxide)

Suitable saturated dialkyl organic peroxides and saturated endo organic peroxides that may be used in combination with the above-described ethylenically unsaturated organic peroxides may include, but are not limited to: 3,3,5,7,7-pentamethyl-1,2,4-trioxepane (sold under the brand name Trigonox® 311); 3,6,9-triethyl-3,6,9-trimethyl-1,4,7-triperoxonane (sold under the brand name Trigonox® 301); 2,5-dimethyl-2,5-di(tert-butylperoxy)hexyne-3 (DYBP); 2,5-dimethyl-2,5-di(tert-amylperoxy)hexane; 2,5-dimethyl-2,5-di(tert-butylperoxy)hexane; di-tert-amyl peroxide; di-tert-butyl peroxide; isopropylcumyl cumyl peroxide; dicumyl peroxide; m/p-di-tert-butylperoxydiisopropylbenzene [also known as a,a'-bis(tert-butylperoxy)diisopropylbenzene]; tert-butylperoxyisopropylbenzene [also known as tert-butyl cumyl peroxide]; m-isopropylolcumyl t-butyl peroxide [also known as tert-butyl 3-isopropylolcumylperoxide]; tert-butyl-4-isopropylcumyl peroxide; tert-butyl-3-isopropylcumyl peroxide; m/p-acetylcumyl t-butyl peroxide; 2(t-butylperoxy)-5-hydroperoxy-2,5-dimethylhexane (Lup D-250); 3-methyl-3-(t-butylperoxy)-2-butanol (sold under the brand name Luperox® D-240); 4-methyl-4-(t-butylperoxy)-2-pentanone (sold under the brand name Luperox® 120); di(3-(t-butylperoxy)-1,3-dimethylbutyl)carbonate (sold under the brand name Luperox® D-242); 1,3,5-tri(1-(t-butylperoxy)1-methylethyl)benzene; and combinations thereof. The Trigonox® products are polymerization initiators obtainable from Akzo Nobel Polymer Chemicals LLC. The Luperox® products are organic peroxides obtainable from Arkema Inc.

The organic peroxide composition may further include at least one free radical trap compound. As understood in the art, the terms "free-radical traps," "scorch retarders," "radical scavengers," or "traps" may be used interchangeably and any of such compounds may be employed in the present invention. Free radical traps are known in the art and may stabilize organic polymers against degradation.

Any suitable free radical trap or a combination thereof may be selected by one skilled in the art, guided by the disclosures herein. For example, suitable free-radical traps may include, but are not limited to, nitroxide living free-radical types, such as 4-hydroxy TEMPO, standard TEMPO, SG-1 [also known as nitroxide, 1-(diethoxyphosphinyl)-2,2-dimethylpropyl 1,1-dimethylethyl free radical]; quinone (including hydroquinone) compounds, such as mono- and di-alkyl ethers of hydroquinone, e.g., mono-t-butyl hydroquinone, di-t-butyl hydroquinone, di-t-amyl hydroquinone and hydroquinone monomethyl ether; hindered phenol antioxidant type radical scavengers, such as butylated hydroxytoluene (BHT) and butylated hydroxyanisole (BHA); and bioflavonoids like vitamin E and oils, such as clove oil; and combinations thereof.

Suitable nitroxide free radicals and related non-nitroxide types of free radical compound radical traps may include, but are not limited to free radicals of the following: nitroxide, 1-(diethoxyphosphinyl)-2,2-dimethylpropyl 1,1-dimethylethyl (SG-1); 4-hydroxy TEMPO; 2,2,6,6-tetramethyl-1-piperidinyloxy (TEMPO); (2,2,6,6-tetramethyl-1-piperidinylox)-polymer bound (TEMPO-Polymer Bound or PS-TEMPO); 16-doxyl-stearic acid methyl ester; 2,2,3,4,5,5-hexamethyl-3-imidazolinium-1-yloxy methyl sulfate; 2,2,6,6-tetramethyl-4-(methylsulfonyloxy)-1-piperidinooxy; 3-(2-iodoacetamido)-proxyl; 3-[2-(2-maleimidoethoxy)ethylcarbamoyl]-proxyl; 3-carbamoyl-proxyl; 3-cyano-proxyl; 3-maleimido-proxyl; 3-beta-doxyl-5 alpha-cholestane; 4-(1-hydroxy-1-methylethyl)2,2,5,5-tetramethyl-3-imidazolinium-1-yloxy; 4-(2-bromoacetamido)-TEMPO; 4-(2-iodo-acetamido)-TEMPO; 4-acetamido-TEMPO; 4-amino-2,2,6,6-tetramethylpiperidine-1-oxyl; 4-amino-TEMPO; 4-carboxy-TEMPO; 4-hydroxy-TEMPO benzoate; 4-maleimido-TEMPO; 4-methoxy-TEMPO; 4-oxo-TEMPO; 4-phenacylidene-2,2,5,5-tetramethylimidazolidazolidin-1-yloxy; 4-phenyl-2,2,5,5-tetramethyl-3-imidazolin-1-yloxy; 4-phosphonooxy-TEMPO hydrate; 5-doxyl-stearic acid; galvinoxyl [also known as 2,6-di-tert-butyl-alpha-(3,5-di-tert-butyl-4-oxo-2,5,-cyclohexadien-1-ylidene)-para-tolyloxy free radical]; methyl 5-doxyl stearate[also known as 2-(4-methoxy-4-oxobutyl)-4,4-dimethyl-2-tridecyl-3-oxazolidinyloxy free radical]; 1-hydroxy-2,2,4,6,6-pentamethyl-4-piperidinyl 3,5-di-tert-butyl-4-hydroxybenzoate; 1-hydroxy-2,2,5,5-tetramethyl-2,5-dihydro-1H-pyrrole-3-carboxylic acid; 3-(2-bromo-acetoamido-methyl)-proxyl; 3-(2-(2-iodoacetamido)acetamido)-proxyl; 3-(2-isothiocyanato-ethyl-carbamoyl)-proxyl; 3-(3-(2-iodo-acetamido)-propyl-carbamoyl)-proxyl; 4-[(1-hydroxy-2,2,6,6-tetramethyl-4-piperidinyl)amino]-4-oxo-2-butenoic acid; bis(1-hydroxy-2,2,4,6,6-pentamethyl-4-piperidinyl)oxalate; tris (1-hydroxy-2,2,4,6,6-pentamethyl-4-piperidinyl) phosphinetricarboxylate; 4-hydroxy-TEMPO benzoate; 2-(5,5-dimethyl-2-oxo-2-lamda-5-[1,3,2]dioxaphosphinan-2-yl)-2-methyl-3,4-dihydro-2H-pyrrole-1-oxide (CY-PMPO); 5-(2,2-dimethyl-1,3-propoxy cyclophosphoryl)-5-methyl-1-pyrroline N-oxide; and combinations thereof.

Suitable quinone free radical traps may include, for example, quinone, hydroquinone (e.g., hydroquinone mono alkyl or aryl ethers), and phenol or catechol types of free radical traps including, but not limited to, p-benzoquinone; hydroquinone (also known as 1,4-benzenediol or 1,4-dihydroxybenzene); hydroquinone monomethyl ether (also known as 4-hydroxyanisole, or MEHQ or 4-methoxyphenol); hydroquinone monoethyl ether; HQMME (hydroquinone monomethyl ether); hydroquinone monophenyl ether; mono-t-butyl hydroquinone [also known as MTBHQ]; di-t-butyl hydroquinone; di-t-amyl hydroquinone; toluhydroquinone; p-benzoquinone; p-benzoquinone dioxime; 2,6-dichloro-1,4-benzoquinone; 2,3,5,6-tetramethyl-1,4-benzoquinone; 2,5-dichloro-3,6-dihydroxy-p-benzoquinone; methyl-p-benzoquinone; 6-anilinoquinoline-5,8-quinone; pyrroloquinoline quinone; 2-allyl-6-methoxybenzo-1,4-quinone; quinhydrone [also known as hydroquinone:benzoquinone 1:1 complex]; 2,5-bis(morpholinomethyl)hydroquinone; 2-phenylhydroquinone; 1,2,4-benzenetriol [also known as hydroxyhydroquinone]; 4-mercaptophenol; bromohydroquinone; chlorohydroquinone; pyrocatechol [also known as 1,2-benzenediol or 1,2-dihydroxybenzene or catechol]; tert-butyl catachol; resorcinol (also known as 1,3-benzenediol).

Suitable hindered phenol antioxidants may be used in combination with other radical traps or alone. Suitable hindered phenol antioxidants may include, for example, BHTT (butylated hydroxytoluene); BHA (butylated hydroxyanisole); and hindered phenol compounds, such as the antioxidants sold under the brand names Irganox® 1010, Irganox® 1076, and Ethanox® 703. Irganox® antioxidants are obtainable from BASF Corp., and Ethanox® antioxidants are obtainable from Albemarle Corp.

Other suitable radical scavengers may include specific unsaturated molecules that possess very easily extractable hydrogens including allylic hydrogens and tertiary hydrogens, such as MAPAE (methoxyallylphenyl allylether); alpha methyl styrene; alpha methyl styrene dimer; 2,4-diphenyl-4-methyl-1-pentene (NOFMER® MSD obtainable from Nippon Oil & Fats Co., Ltd. with offices in Tokyo, JP);

dibutyl maleate; allyl malonic ester; various mono-allylic compounds; nonyl maleate ester; and diethyl fumarate, for example.

In an exemplary embodiment, the free radical trap comprises 4-hydroxy TEMPO and mono-tert-butyl hydroquinone (MTBHQ).

The organic peroxide composition may further include at least one mono- or poly-unsaturated compound in addition to the at least one ethylenically unsaturated organic peroxide, the at least one saturated organic peroxide and the at least one free radical trap. Suitable unsaturated compounds include those having a structure containing one or more carbon-carbon double bonds. In particular, mono-unsaturated compounds include only a single carbon-carbon double bond per molecule, and poly-unsaturated compounds include compounds with two or more carbon-carbon double bonds per molecule (e.g., di-unsaturated compounds, tri-unsaturated compounds). Combinations of different mono- and/or poly-unsaturated compounds may be utilized.

Suitable mono- and/or poly-unsaturated crosslinking coagent compounds used in the present invention may include, but are not limited to, alpha-methylstyrene dimer (NOFMER® MSD) and various diallyl and triallyl functional compounds, such as triallyl cyanurate [2,4,6-tris (2-propenyloxy)-1,3,5-triazine or TAC], triallyl isocyanurate, triallyl trimellitate, trimethylolpropane triallyl ether, triallyl phosphate, trimethylolpropane diallyl ether, pentaerythritol triallyl ether, 1,3,5-triallyl-1,3,5-triazinane-2,4,6-trione, triallyl trimesate [triallyl 1,3,5-benzenetricarboxylate], diallylmaleate, diallyl phthalate, diallyl isophthalate, diallyl terephthalate, diallyl adipate, diallyl maleinate, diallyl fumarate, diallyl ether, triallyl citrate, diallyl carbonate, diallyl diglycol carbonate (available commercially from PPG under the product designation CR-39®) and the like and combinations thereof. Examples of mono-unsaturated crosslinking coagents that could be used alone or in combination with one or more poly-unsaturated crosslinking coagents include, but are not limited to, allyl alcohol, octyl acrylate, decyl acrylate, octyl/decyl acrylate blend, glycerol allyl ether, 3-allyloxy-1,2 propanediol, triethoxyvinyl silane and trimethoxyvinyl silane.

The constituents of the organic peroxide composition may be provided in any suitable and effective amounts. For example, in one embodiment of the present invention, an organic peroxide composition may include 0.5-60% by weight ethylenically unsaturated organic peroxide, preferably 5-30%; 5-60% by weight saturated organic peroxide, preferably 15-40%; 0.1-30% by weight free radical trap, preferably 1-10%; and 20-80% by weight mono- and/or poly-unsaturated compound, preferably 35-70%. In an exemplary embodiment, the organic peroxide composition is a liquid or near liquid at room temperature and the ethylenically unsaturated organic peroxide is 1-(2-tert-butylperoxyisopropyl)-3-isopropenylbenzene; the saturated organic peroxide is m/p-di(t-butylperoxy)diisopropyl-benzene; the free radical trap is a mixture of 4-hydroxy TEMPO and mono-tert-butyl hydroquinone (MTBHQ); and the mono- or poly-unsaturated compound is triallyl cyanurate (TAC).

Other advantageous embodiments of the organic peroxide composition of the present invention may be characterized as follows:

An organic peroxide composition comprising, consisting essentially of or consisting of:
a) 20-30% by weight in total, based on the total weight of a), b), c) and d), of one or more ethylenically unsaturated organic peroxides (in particular, 1-(2-tert-butylperoxyisopropyl)-3-isopropenylbenzene);

b) 20-30% by weight in total, based on the total weight of a), b and d), of one or more saturated organic peroxides (in particular, m/p-di(t-butylperoxy)diisopropyl-benzene);

c) 35-55% by weight in total, based on the total weight of a), b), c) and d), of one or more crosslinking coagents selected from the group consisting of diallyl and triallyl functional compounds (in particular, triallyl cyanurate) and combinations thereof;

d) 1-10% by weight in total, based on the total weight of a), b), c) and d), of one or more free radical traps selected from the group consisting of nitroxides (in particular, 4-hydroxy TEMP) and hydroquinone mono alkyl ethers (in particular, mono-test-butyl hydroquinone) and combinations thereof.

As used herein, unless specified otherwise, the values of the constituents or components of the formulation are expressed in weight percent or % by weight of each ingredient in the peroxide composition based on the total weight of the organic peroxide composition.

In another embodiment of the present invention, the organic peroxide composition may be made by mixing together at least one functionalized organic peroxide containing at least one carbon-carbon double bond, at least one saturated organic peroxide, optionally, at least one free radical trap compound, and optionally, at least one mono- or poly-unsaturated compound. The ingredients may be mixed together using any suitable techniques known in the art. For example, the constituents may be mixed together using a paddle or ribbon (e.g., helical) mixer. The ingredients may be mixed together simultaneously or in any sequential order to result in a homogeneous composition.

In a preferred embodiment, the organic peroxide composition is a liquid or near liquid at room temperature with a melting point of less than or equal to 25° C. As used herein, liquid or near liquid is intended to mean the composition is a liquid, or a mixture of liquid and solid at ambient temperatures of 25° C. to 35° C. depending upon the climate, location and storage locations.

The peroxide compositions of the present invention can also be low melting solids with melting points below 50° C., preferably less than or equal to 45° C., more preferably less than 40° C., or even more preferably less than or equal to 35° C.

For example, the organic peroxide crosslinking compositions may be completely liquid or borderline liquid (e.g., a mixture of solids and liquid) at temperatures around about 68-77° F. (20-25° C.). Preferably, the organic peroxide compositions remain liquid or near liquid at temperatures as low as about 40° F. or even lower.

The ability to formulate organic peroxide compositions which, in accordance with certain embodiments of the present invention, are in the form of liquids, near liquids or low melting point solids is significant because the high melting point solid peroxide compositions previously used require hot air ovens or water baths at about 65° C. to melt the art peroxide compositions at ~55° C. Thus, the liquid, near liquid, or low melting point solid peroxide compositions according to this invention provide an advantage by being able to easily and uniformly mix with a molten polymer or by being easily sprayed onto powdered polymer or granular polymer or polymer pellets.

While the organic peroxide compositions are preferably in liquid form, they may also be prepared into other suitable forms, such as low melting or extended peroxides. For is example, the peroxide compositions may be extended on inert fillers, powdered polymers, or pelletized polymers. The peroxide compositions may be prepared in free-flowing powder forms or pelletized forms. Additionally or alternatively, the peroxide compositions may be melt blended into various polymers or elastomers to produce curable materials, concentrates or masterbatches.

The organic peroxide composition may be applied to the fillers using any suitable techniques known in the art. In particular, suitable techniques may be employed to apply the peroxide composition in such a manner so that a uniform distribution of peroxide on the filler occurs. For example, the peroxide composition may be sprayed onto the filler to achieve a uniform distribution.

In another embodiment of the present invention, a method of forming a crosslinked polymer includes processing a polymer or polymer precursor in the presence of the organic peroxide composition to form a crosslinked polymer.

To further improve the overall experience during the rotomolding process of crosslinked polymers with organic peroxides, the use of small amounts of one more "deodorant compounds", used singly or in blends, can be added to the organic peroxide composition. These "deodorant compounds" can be natural oil esters and preferably, are fragrant compounds that contain at least one free radically-reactive carbon-carbon double bond (C=C). These compounds provide fragrance during molding and then may chemically bond to the polymer during the crosslinking process. One or more deodorant compounds obtained from natural sources, such as essential oils or fractionated components thereof may be utilized.

One of the preferred deodorant compounds is a renewably-sourced compound called limonene; another is jasmonic acid. Limonene is present as the majority component in the following natural occurring oils: orange oil, lemon oil, grapefruit oil, and lavender oil. Thus, in certain embodiments the organic peroxide composition comprises limonene or one or more of the naturally occurring oils listed above, that contains limonene. Jasmonic acid is a free-radically reactive compound present in jasmine oil. Thus either jasmonic acid or the essential oil of jasmine can be used. Similarly, there are many other "deodorant" compounds for use in the practice of this invention. These compounds and their respective flower essential oils in which they are present can be used, alone or in combination: (−)cis-rose oxide, beta-damascenone and beta-ionone, which are present in rose oil; eugenol, which is present in carnation oil and clove oil; beta-caryophyllene, which is present in carnation oil, alpha-ionone and beta-ionone, which are in violet oil; linalool, [E]-beta-ocimene and myrcene, which are present in lily oil; ocimenol and cinnamyl alcohol, which are present in hyacinth oil; and lilac aldehyde and lilac alcohol, which are present in lilac oil. Pinene compounds such as alpha-pinene and beta-pinene may also be used, and other fragrant terpenes (as exemplified by limonene).

These reactive "deodorants" compounds can be used singly or in combination to achieve a desired fragrance effect or experience.

These fragrant reactive deodorant additives are typically used in amounts of less than 15%, preferably less than 10% most preferably less than 5% even more preferably less than 2% based on the total weight of the organic peroxide formulation. The amount of deodorant compound used in the organic peroxide composition will depend upon the end use and the amount of organic peroxide composition used in preparing a crosslinked polymer. The deodorant compound or combination of deodorant compounds may, in various exemplary embodiments of the invention, comprise at least 0.01%, at least 0.05% or at least 0.1% of the organic peroxide composition, based on the total weight of the organic peroxide composition.

There are many other commercially available non-free radically-reactive compound fragrance oils that one skilled in the art could consider for use as deodorants or reodorants in polymers and elastomers in the organic peroxide compositions of the present invention. For example, not wishing to be limited, one or more of the following fragrance oils may be used: vanilla, banana, rum, tutti fruit, cherry, linen, and the like.

A polymer or polymer precursor may be crosslinked in the presence of the organic peroxide compositions of the present invention. Any suitable and effective amount of organic peroxide composition may be used to crosslink or react the polymer or polymer precursor. The polymer may include any polymeric substance, such as thermoplastics, elastomers, or thermoplastic elastomers. In particular, the peroxide compositions are suitable for manufacturing thermoplastic vulcanizates (TPVs) via dynamic vulcanization and/or to fully crosslink free-radical curable polymers and elastomers known in the art. The polymer precursors may include any precursors known in the art to form polymers, such as liquid oligomers, especially those precursors capable of reacting via free radical mechanisms to form polymers.

The peroxide compositions of the present invention may be used, for example, to crosslink polymers, in particular polyolefin polymers such as polyethylene (PE). In particular, the peroxide compositions of the present invention may be used to form crosslinked high density polyethylene (HDPE), crosslinked low density polyethylene (LDPE), crosslinked linear low density polyethylene (LLDPE), crosslinked polyethylene blends, crosslinked polyethylene copolymers, and crosslinked polyethylene terpolymers, for example. Suitable crosslinkable polymers may also include, for example, ethylene-propylene terpolymer (EPDM), ethylene-propylene copolymer (EPM), natural polyisoprene rubber (NR), styrene butadiene rubber (SBR), polybutadiene rubber (BR), synthetic polyisoprene rubber (IR), ethylene-vinyl acetate (EVA), acrylonitrile-butadiene-styrene (ABS), unsaturated polyesters, styrene-butadiene-styrene block copolymers (SBS), styrene-isoprene-styrene block copolymers (SIS), neoprene rubber (CR), nitrite rubber (NBR), polysulfide rubber (T), chlorinated polyethylene (CM), polyurethane (AU, EU), vinylidene fluoride copolymers (CFM), silicone rubber (PMQ), vinyl silicone rubber (VMQ, PVMQ), polyacrylate (ACM), chlorosulfonated poly(ethylene) (CSM), and fluorosilicone rubber (FVMQ). Polymer precursors include monomeric as well as oligomeric substances capable of being reacted or cured to form polymers.

The polymer or polymer precursor may be contacted with the organic peroxide composition and processed in any suitable manner known to those skilled in the art. For example, because thermoplastics and elastomers are typically solid at room temperature, such polymers may be melted (e.g., subjected to melt compounding) and/or mechanically mixed at elevated temperatures. The elevated temperatures also serve to initiate the generation of free radical species from the organic peroxides, which then participate in reactions leading to the crosslinking of the polymer. The organic peroxide compositions may be added at any time and mixed with the polymer. Other desired ingredients, such as dyes, pigments, fillers, UV stabilizers, heat stabilizers, etc. may also be incorporated into the polymer as would be recognized by one skilled in the art.

In an exemplary embodiment, the polymer is processed with the organic peroxide composition in a rotational molding or rotomolding process. Rotomolding is a molding process where a heated mold causes the polymer to melt and the mold is slowly rotated to allow the molten polymer to coat the sides of the mold. For example, preferred rotational molding conditions for HDPE are about 190° C.-200° C. based on PIAT (peak internal air temperature) measurements. The mold may continue to rotate during the cooling phase, e.g., to maintain thickness consistency. It is envisioned, however, that any suitable polymer processing and associated conditions would be readily apparent to one skilled in the art.

The organic peroxide compositions according the invention provide a combination of a number of desirable characteristics; including the compositions may desirably be in liquid form at room temperature, the organic peroxide compositions exhibit good crosslinking performance in a reasonable period of time; and the organic peroxide compositions have low odor and improved volatility.

Notably, compositions in accordance with the present invention have been found to have enhanced scorch performance at cure temperatures. As used herein, "scorch time" is understood as the time to onset of crosslinking. Thus, a "longer scorch time" is understood to mean the ability of the peroxide composition to delay the cure enough to allow complete melting of the crosslinkable polymer and/or provide an initial extended lower polymer viscosity to enable any gaseous decomposition by-products or air to escape the melt prior to complete crosslinking. The scorch time may be calculated as ts0.4 (mins) where the scorch time (in minutes) is obtained based on an increase of 0.4 dN-m in torque starting from the time to achieve the minimum torque (ML). Generally, as will be subsequently explained, the ML achieved using organic peroxide compositions in accordance with preferred embodiments of the invention has been found to be (zero) 0 dN-m. The scorch time is a measurement of the amount of time to reach 4% crosslinking where the maximum torque (MH) value is approximately 7 to 11 dN-m. These measurements are done at 190° C. with a 1 degree arc and 100 cpm.

In an exemplary embodiment, the scorch time, calculated as $ts_{0.4}$ (minute(s), is 0.84 or higher (preferably 0.88 or higher). This, again, is measured at 190° C. temperatures. The $ts_{0.4}$ scorch time values will be much higher at lower test temperatures (e.g., 160° C.), as demonstrated in the practice of the present invention. Thus, organic peroxide compositions according to the present invention exhibit enhanced scorch times, which provides for a longer onset time at lower temperatures during the time when the polymer adheres to the mold and begins to melt. The polymer (e.g., HDPE) resin continues to rise in temperature prior to reaching the PIAT (peak, i.e., maximum, internal air temperature) of the mold. The enhanced scorch time performance prior and approaching the cure temperature allows for complete melting of the polymer (e.g., HDPE powder melt) and good flow in the mold to provide a uniform thickness layer, prior to the final crosslinking phase.

In addition to scorch time, the time to achieve 90% of the final cure ($tc_{90}$) is also important. The longer the $tc_{90}$ cure time, the longer the crosslinking cycle time. Accordingly, longer cure times generally mean lower productivity, unless higher cure temperatures are used. Using higher cure temperatures results in polymer oxidation and premature aging and increased color (yellowing) formation. The organic peroxide compositions of the present invention cure in a shorter time with sufficient scorch time and, therefore, do not suffer from inconsistent or under-cure of the polymers. The $tc_{90}$ value may typically range from about 2.8 to 4 minutes at the 190° C., 1 deg arc and 100 cpm test parameters for the MDR or RPA rheometers manufactured by Alpha Technologies in Akron, Ohio when compositions in accordance with the present invention are employed. For DYBP, the $tc_{90}$ values range from about 7 to 10 minutes under the same conditions.

The organic peroxide compositions of the present invention were also found to reduce the porosity issues of the polymers. This may be due, at least in part, to the delay in onset of the crosslinking reaction (i.e., longer scorch time at cure temperature), which provides time for the gases to escape from the polymer before crosslinking is complete. For example, the air in the polymer may degas during processing, e.g., during the sintering phase of rotomolding. Therefore, the chance for porosity issues to develop during processing is minimized, and low porosity parts may be formed. Further reduction in porosity may be possible because the monomeric decomposition by-product fragments of the ethylenically unsaturated organic peroxide become permanently crosslinked into the polymer (e.g., HDPE) network.

The peroxide compositions of the invention were also found to provide good air and skin hygiene. Moreover, air and skin irritants are reduced because acetylenic decomposition by-products are minimized or eliminated. Thus, lower levels of decomposition by-products, namely little or no acetylenic decomposition by-products, leads to a great improvement in air and skin hygiene and safety.

Thus, the inventors have discovered a distinct advantage in increased scorch time protection at crosslinking temperatures while also reducing the amount of gaseous peroxide decomposition by-products. This is particularly helpful in forming parts, such as engineering hoses, O-ring gaskets, and wire & cable insulation.

These are important considerations for the commercial application of rotational molding, including HDPE rotational molding, and also for the production of pipe, including PEX-A pipe (HDPE pipe crosslinked with peroxides).

EXPERIMENTAL EQUIPMENT AND PROCEDURES USED IN THE EXAMPLES

Alpha Technologies MDR® 2000E, Moving Die Rheometer (also referred to as an "MDR" herein) was used to study the crosslinking performance of the various peroxide formulations in a rotational molding grade of HDPE resin. The MDR provided the determination of the final state of cure MH (dN-m) and in particular the $ts_{0.4}$ scorch time data, which determines the time prior to onset of crosslinking. The MDR was set to a 1° arc and the instrument measured torque at a frequency of 100 cpm (cycles per minute) Cure temperatures were 190° C. for both the upper and lower die platens.

The scorch time was measured and reported as $ts_{0.4}$ in minutes. The $ts_{0.4}$ is defined as the time to achieve 0.4 dN-m increase in torque from the minimum torque ML (dN-m). The scorch time of $ts_{0.4}$ was chosen to be measured as the typical cured sample had a maximum torque (MH) of about 8.5 dN-m to about 10.5 dN-m. Thus, $ts_{0.4}$ represents the safe flow time available prior to a 4% to 4.5% crosslinking state. Flow of the HDPE polymer was important and flow and gel formation happened early, due to the development of chain entanglements. This was followed quickly by crosslinked networks that formed the beginning of gel networks, which slowed the polymer flow in the mold. Too short of a time for $ts_{0.4}$ may trap air or gaseous products resulting in porosity issues in the final part.

The parameters assessed were for the purpose of identifying peroxide compositions that are liquid or near-liquid at room temperature and capable of simultaneously providing a desirable $ts_{0.4}$ scorch time to allow for de-gassing as well as a fast $tc_{90}$ cure time for good productivity, while generating safer and less gaseous decomposition by-products.

ABBREVIATIONS USED IN THE EXAMPLES

MH=maximum torque in dN-m, which relates to crosslinking.
ML=minimum torque in dN-m
MH−ML=relative degree of crosslinking.
$ts_{0.4}$=scorch time in minutes to obtain an increase of 0.4 dN-m in torque starting from the minimum torque ML. This is considered as the time to onset of crosslinking.
$ts_1$=scorch time in minutes to obtain an increase of 1 dN-m torque starting from the is minimum torque ML.
$tc_{90}$=time to 90% of final cure, in minutes.
phr=parts of ingredient per hundred parts of resin (i.e., HDPE)
D-16=t-butylperoxyisopropylbenzene (a saturated organic peroxide).
IP-D16=1-(2-tert-butylperoxyisopropyl)-3-isopropenylbenzene unsaturated organic peroxide)
Lup F=Luperox® m/p-di(t-butylperoxy)diisopropylbenzene, where the m/p isomer ratio typically is from 58:42 m/p to 70:30 m/p (a product of Arkema Inc.).
TAC=triallyl cyanurate.
OHT=4-Hydroxy TEMPO.
DYBP=2,5-dimethyl-2,5-di(tert-butylperoxy)hexyne-3.
MTBHQ=mono-tert-butyl hydroquinone.

EFFICIENCY FACTOR EQUATION

Improving productivity while maintaining part quality is a goal of most manufacturing operations. In crosslinked rotomolding operations, it is desirable to have increased cure efficiency because it results in improved productivity. It is desirable to maintain good crosslinking performance and scorch time while not experiencing longer cure times. A way to study the effect of the amount of crosslinking obtained (MH−ML in to dN-m) in relation to the resulting cure time ($tc_{90}$) and scorch time ($ts_{0.4}$) is by measuring the Efficiency Factor, as calculated using the Efficiency Factor Equation below:

$$\text{Efficiency Factor} = [(MH-ML) \times ts_{0.4}] \div (tc_{90} - ts_{0.4}),$$

A larger numerical Efficiency Factor value means higher crosslinking efficiency, which leads to higher productivity. In the Examples below, crosslinking, scorch and cure time data were generated for use in this equation using a MDR rheometer at 190° C., 1° arc strain and 100 cycles/min frequency.

In all of the Examples below, the ML value in each case was found to be zero and therefore it is not noted in the tables. When ML=0, the Efficiency Equation above can be re-written as follows:

$$\text{Efficiency Factor (for } ML=0) = [MH \times ts_{0.4}] \div (tc_{90} - ts_{0.4}),$$

EXAMPLES

Example 1

In summary, Tables 1 and 2 show comparative examples not in accordance with the present invention, wherein organic peroxide compositions containing little or no "unsaturated" organic peroxide were evaluated. Comparative compositions 1 and 2 employed "saturated" organic peroxides, a TAC coagent and/or MTBHQ, but no "unsaturated" organic peroxide. Comparative compositions 3-5 comprised at least one "unsaturated" peroxide, at least one "saturated" organic peroxide, at least one coagent (e.g. TAC) and MTBHQ, wherein the amount of "unsaturated" organic peroxide was less than 10% of the total weight of "unsaturated" organic peroxide plus "saturated" organic peroxide. Table 1 provides the details of the organic peroxide compositions.

Table 2 provides the MDR rheometer results when using these peroxide compositions to crosslink HDPE at 190° C. using a 1 degree arc and 100 cpm (cycles/min) frequency as outlined in the experimental equipment and procedures section.

Compositions 3-5 in Table 1 were found to be partially liquid at room temperature. They may be referred to as "partial liquid" because, after the compositions were prepared by heating the composition components to 50° C. and allowing the mixture to cool to room temperature (25° C.), they remained room temperature stable liquids for two days, after which small amounts of crystals started to develop. However, these crystals re-dissolved quickly with some gentle warming of the solution. In summary, when such peroxide compositions are prepared, they could serve as room temperature liquid formulations if prepared and used in a typical 8 to 12 hour shift in an industrial setting without the need for additional heating. In contrast, after preparing Compositions 1 and 2 (containing no "unsaturated" organic peroxide) in a similar fashion, such compositions solidified within a few hours at room temperature (25° C.) after their preparation at 50° C.

As shown by the data in Table 2, Composition 1 containing only the "saturated" organic peroxide 2,5-dimethyl-2,5-di(tert-butylperoxy)hexyne-3 (DYBP) along with TAC coagent provided a $ts_{0.4}$ scorch time of 1.05 minutes arad an undesirably long cure time $tc_{90}$ of 6.65 minutes with a crosslinking MH of 7.37 dN-m, when evaluated in HDPE at 190° C. in an MDR rheometer at a concentration of 1 phr.

Composition 2, which used only the "saturated" type organic peroxide m/p t-butylperoxy)diisopropylbenzene (Lup F) along with TAC coagent and MTBHQ, provided a $ts_{0.4}$ scorch time of 0.89 minutes with a 3.85 minute $tc_{90}$ cure time and a crosslinking MH of 7.79 dN-m.

In contrast, Compositions 3-5 used low levels of an "unsaturated" organic peroxide IP-D16 in combination with a "saturated" organic peroxide (Lup F), together with TAC and MTBHQ. In these blends, the level of the IP-D16 component in the peroxide composition ranged from 0.9% to 1.8%. The weight ratio of ethylenically unsaturated organic peroxide to saturated organic peroxide ranged from 1:19.1 (Composition 5) to 1:38.2 (Composition 3). The amount of crosslinking based on the measured MH (dN-m) values increased with such blends, despite the fact that the peroxide compositions were used at 1 phr concentration in the HDPE resin, identical to the use level for Compositions 1 and 2. Additionally, there were no acetylenic decomposition by-products and the amount of gaseous by-products was reduced.

The crosslinking Efficiency Factor was determined for all peroxide compositions. The Efficiency Factor values and the increase or change in Efficiency versus Composition 2 have been provided in Table 2. In summary, the peroxide compositions containing some amount of "unsaturated" peroxide (Compositions 3-5) provided a meaningful and unexpected increase in crosslinking efficiency, ranging from 53% to 61%.

The improvements in crosslinking efficiency obtained using Compositions 3-5 are more pronounced versus the Composition 1 peroxide composition, which had the lowest Efficiency Factor of 1.38. The percent increase in the Efficiency Factor for Composition 3, which had a value of 3.76, represents a >172% improvement in productivity versus the Composition 1 peroxide blend.

perature of 25° C. Composition 6 was placed in a refrigerator over the weekend at 40° F., and unexpectedly remained a 100% homogeneous liquid. The use of a relatively high amount of "unsaturated" organic peroxide, in accordance with the present invention, provided a desirable liquid (at room temperature) organic peroxide composition that does not generate skin irritating by-products when crosslinking HDPE, minimizes gaseous decomposition by-products and produces greater crosslinking of HDPE, with greater overall efficiency, when compared to prior art formulations (based on DYBP or "saturated" organic peroxide) on an equal weight basis.

As shown in Table 4, when crosslinking HDPE, the presence of the "unsaturated" organic peroxide IP-D16 in Composition 6 is believed to have lowered the amount of

TABLE 1

| | | | Peroxide Compositions | | | | | |
|---|---|---|---|---|---|---|---|---|
| Composition | Generic Description | Form at 25° C. | MTBHQ | Lup F | IP-D16 | DYBP | TAC | Sum total |
| Composition 1 | DYBP + TAC | Liquid | 0% | 0% | 0% | 40.0% | 60.0% | 100.0% |
| Composition 2 | Lup F + TAC + MTBHQ | Solid | 2.5% | 35.8% | 0% | 0% | 61.7% | 100.0% |
| Composition 3 | Lup F + TAC + MTBHQ + IP-D16 | Partial | 2.5% | 34.4% | 0.9% | 0% | 62.2% | 100.0% |
| Composition 4 | Lup F + TAC + MTBHQ + IP-D16 | Partial | 2.5% | 34.4% | 1.4% | 0% | 61.7% | 100.0% |
| Composition 5 | Lup F + TAC + MTBHQ + IP-D16 | Partial | 2.5% | 34.4% | 1.8% | 0% | 61.3% | 100.0% |

TABLE 2

| | | | Crosslinking HDPE | | | Measuring Crosslinking Efficiency (Productivity) | |
|---|---|---|---|---|---|---|---|
| | | | MDR Rheometer data at 190° C., 1° arc, 100 cpm | | | | % Increase in Efficiency |
| Composition | Generic Description | Blend phr | MH dN-m | $ts_{0.4}$ min. | $tc_{90}$ min. | Efficiency Factor | vs the solid Composition 2 |
| Composition 1 | DYBP + TAC | 1.0 | 7.37 | 1.05 | 6.65 | 1.38 | Liquid Control |
| Composition 2 | Lup F + TAC + MTBHQ | 1.0 | 7.79 | 0.89 | 3.85 | 2.34 | Solid Control |
| Composition 3 | Lup F + TAC + MTBHQ + IP-D16 | 1.0 | 8.77 | 0.84 | 2.85 | 3.67 | 56% |
| Composition 4 | Lup F + TAC + MTBHQ + IP-D16 | 1.0 | 9.2 | 0.84 | 3.0 | 3.58 | 53% |
| Composition 5 | Lup F + TAC + MTBHQ + IP-D16 | 1.0 | 10.01 | 0.80 | 2.93 | 3.76 | 61% |

Example 2

In this example, an organic peroxide composition (Composition 6) in accordance with the present invention was prepared by blending an "unsaturated" organic peroxide (at a high concentration, relative to the amount of "saturated" organic peroxide), a "saturated" organic peroxide, TAC coagent and MTBHQ into a uniform liquid curative for crosslinking HDPE and other polymers.

As shown in Table 3, Composition 6 was prepared using equal weights (26.40%:26.40%, i.e., 1:1) of an "unsaturated" organic peroxide (IP-D16) 1-(2-tert-butylperoxyisopropyl)-3-isopropenylbenzene and a "saturated" organic peroxide (Lup F) m/p-di(t-butylperoxy)diisopropylbenzene with a ~70% meta to ~30% para isomer ratio, which were blended with TAC coagent and MTBHQ. Unexpectedly, Composition 6 was completely liquid at an ambient temgaseous decomposition by-products generated. Composition 6 produced a scorch time $ts_{0.4}$ of 0.88 minutes while resulting in a desirable increase in the MH of 10.20 dN-m crosslinking. Unexpectedly, the amount of crosslinking of HDPE achieved by the use of Composition 6 was significantly higher as compared to when Composition 2 was used, based upon the significantly higher MH value of 10.2 dN-m, (versus 8.54 dN-m) while maintaining the tc90 cure time at 3.5 minutes. This was especially unexpected based upon the equal weight use level in the HDPE of 1.1 phr.

The Efficiency Factors were calculated for each peroxide blend in this example. Composition 6 provided a significantly higher Efficiency Factor when considering all the joint improvements in the amount of crosslinking, crosslinking time and scorch time compared to the two comparative examples (using Compositions 1 and 2).

TABLE 3

| Composition | Generic Description | Form at 25° C. | MTBHQ | Lup F | IP-D16 | DYBP | TAC | Sum total |
|---|---|---|---|---|---|---|---|---|
| Composition 1 (Comparative) | DYBP + TAC | Liquid | 0% | 0% | 0% | 40.0% | 60.0% | 100.0% |
| Composition 2 (Comparative) | Lup F + TAC + MTBHQ | Solid | 2.5% | 35.8% | 0% | 0% | 61.7% | 100.0% |
| Composition 6 (Invention) | Lup F + TAC + MTBHQ + IP-D16 | Liquid | 2.6% | 26.4% | 26.4% | 0% | 44.6% | 100.0% |

TABLE 4

| | | | Crosslinking HDPE MDR Rheometer data | | | Measuring Crosslinking Efficiency (Productivity) | |
|---|---|---|---|---|---|---|---|
| | | | @ 190° C., 1° arc, 100 cpm frequency | | | | % Increase in Efficiency |
| Composition | Generic Description | Blend phr | MH dN-m | $ts_{0.4}$ min. | $tc_{90}$ min. | Efficiency Factor | vs the solid Composition 1 |
| Composition 1 | DYBP + TAC | 1.0 | 7.37 | 1.05 | 6.65 | 1.38 | Liquid control |
| Composition 2 | Lup F + TAC + MTBHQ | 1.1 | 8.54 | 0.87 | 3.58 | 2.74 | Solid control |
| Composition 6 (Invention) | IP-D16 + Lup F + TAC + MTBHQ | 1.1 | 10.2 | 0.88 | 3.5 | 3.43 | 148% |

In general, increasing the concentration of IP-D16 in a Luperox F+TAC+MTBHQ composition provides a significant and unexpected improvement in % cure efficiency. This increased cure efficiency is due to the unique, beneficial combination of increased crosslinking with increased scorch time. Increased crosslinking provides for generally better physicals and increased scorch time provides for generally better polymer to processing and flow before complete cure. Below is a plot of the unexpected trend of higher % cure efficiency when increasing the IP-D16 concentration in our novel peroxide formulations. The data used to make this simple plot was taken from Examples 1 & 2.

Example 3

In Example 3, further improvements to the Composition 6 peroxide composition described in Example 2 were made. The basic formulation of Composition 6 (containing equal weight amounts of "unsaturated" and "saturated" organic peroxides) was maintained, but the MTBHQ was completely replaced with (OHT) 4-hydroxy TEMPO at a higher use level. Additionally, the peroxide and TAC concentrations were readjusted, so that the sum total of the mixture added up to 100% as shown in Table 5. This new peroxide composition is referred to herein as Composition 7.

This example illustrates that following the teachings of this invention, it is possible to obtain significantly improved crosslinking efficiency (and hence enhanced productivity) while being able to obtain improvements in certain cure attributes, in this case $ts_{0.4}$ scorch time. When Composition 7 was used to crosslink HDPE at 190° C., a longer $ts_{0.4}$ scorch time of 0.90 minutes was unexpectedly obtained, while maintaining the $tc_{90}$ cure time of 3.5 minutes (see Table 6). The end result was a further increase in the crosslinking Efficiency Factor from 3.43 to 3.50 when comparing the performance of Composition 6 to the performance of Composition 7 as shown in Table 6. Furthermore, both Compositions 6 and 7 remained in stable 100% homogeneous liquid form at an ambient temperature of 25°, while generating less gaseous products than Composition 1 when crosslinking HDPE.

TABLE 5

| Composition | Generic Description | Form at 25° C. | OHT | MTBHQ | Lup F | IP-D16 | DYBP | TAC | Sum total |
|---|---|---|---|---|---|---|---|---|---|
| Composition 1 (Comparative) | DYBP + TAC | Liquid | 0% | 0% | 0% | 0% | 40.0% | 60.0% | 100.0% |
| Composition 6 (Invention) | IP-D16 + Lup F + TAC + MTBHQ | Liquid | 0% | 2.6% | 26.4% | 26.4% | 0% | 44.6% | 100.0% |
| Composition 7 (Invention) | IP-D16 + Lup F + TAC + OHT | Liquid | 8.0% | 0% | 25.0% | 25.0% | 0% | 42.0% | 100.0% |

TABLE 6

| Composition | Generic Description | Blend phr | Crosslinking HDPE MDR Rheometer data @ 190° C., 1° arc, 100 cpm frequency | | | Measuring Crosslinking Efficiency (Productivity) | |
|---|---|---|---|---|---|---|---|
| | | | MH dN-m | $ts_{0.4}$ min. | $tc_{90}$ min. | Efficiency Factor | % Increase in Efficiency vs the liquid Composition 1 |
| Composition 1 (Comparative) | DYBP + TAC | 1.0 | 7.37 | 1.05 | 6.65 | 1.38 | Liquid control |
| Composition 6 (Invention) | IP-D16 + Lup F + TAC + MTBHQ | 1.1 | 10.2 | 0.88 | 3.5 | 3.43 | 149% |
| Composition 7 (Invention) | IP-D16 + Lup F + TAC + OHT | 1.1 | 10.1 | 0.90 | 3.5 | 3.50 | 154% |

Example 4

In Example 4, the formulations from the previous example were further modified. Composition 7 was modified by replacing the 8% OHT additive with a blend of 3.9% OHT plus 2.5% MTBHQ as shown in Table 7, while maintaining the blend of "saturated" and "unsaturated" peroxides and the TAC coagent, in accordance with the present invention. The composition was re-adjusted so that all components in this blend added up to 100%. This new formulation is referred to herein as Composition 8. When crosslinking HDPE with 1.1 phr of Composition 8, a $ts_{0.4}$ scorch time of 0.95 minutes was obtained. This demonstrates that the present invention makes it possible to attain enhanced crosslinking efficiency while adjusting key cure parameters such as $ts_{0.4}$ scorch time which may be needed to increase HDPE melt flow time in a more complex mold design for a rotational molding application, before crosslinking begins and HDPE melt flow begins to slow.

Composition 8 was a liquid and 100% homogeneous at the 25° C. ambient temperature. This blend offers several advantages over Composition 1 because it does not have the acetylenic by-product issues and provided a faster $tc_{90}$ cure time of only 3.7 minutes, versus 6.65 minutes, thus providing improved productivity. Using the Efficiency Factor equation, an unexpected significant improvement in productivity was observed while approaching the longer $ts_{0.4}$ scorch time, while providing a more desirable increase in crosslinking.

Composition 8 provides more time for the HDPE powder to melt due to the higher $ts_{0.4}$ (minutes) of nearly one minute which may be required to form thick walled or complex HDPE rotomolded parts. It also has fewer issues of porosity and odor and generated much less gaseous decomposition by-products and fewer volatility issues as compared to Composition 1. Porosity and odor can be judged by both rotational molding crosslinked parts and examining the condition and odor (by smelling) the crosslinked parts or crosslinked HDPE samples after the MDR rheometer cure at 190° C.

TABLE 7

| Composition | Generic Description | Form at 25° C. | Peroxide Compositions | | | | | | Sum total |
|---|---|---|---|---|---|---|---|---|---|
| | | | OHT | MTBHQ | Lup F | IP-D16 | DYBP | TAC | |
| Composition 1 (Comparative) | DYBP + TAC | Liquid | 0% | 0% | 0% | 0% | 40.0% | 60.0% | 100.0% |
| Composition 2 (Comparative) | Lup F + TAC + MTBHQ | Solid | 0% | 2.5% | 35.8% | 0% | 0% | 61.7% | 100.0% |
| Composition 6 (Invention) | IP-D16 + Lup F + TAC + MTBHQ | Liquid | 0% | 2.6% | 26.4% | 26.4% | 0% | 44.6% | 100.0% |
| Composition 7 (Invention) | IP-D16 + Lup F + TAC + OHT | Liquid | 8.0% | 0% | 25.0% | 25.0% | 0% | 42.0% | 100.0% |
| Composition 8 (Invention) | IP-D16 + Lup F + TAC + OHT + MTBHQ | Liquid | 3.9% | 2.5% | 25.5% | 25.5% | 0% | 42.6% | 100.0% |

TABLE 8

| Composition | Generic Description | Blend phr | Crosslinking HDPE MDR Rheometer data @ 190° C., 1° arc, 100 cpm frequency | | | Measuring Crosslinking Efficiency (Productivity) | |
|---|---|---|---|---|---|---|---|
| | | | MH dN-m | $ts_{0.4}$ min. | $tc_{90}$ min. | Efficiency Factor | % Increase inb Efficiency vs Liquid Composition 1 |
| Composition 1 (Comparative) | DYBP + TAC | 1.0 | 7.37 | 1.05 | 6.65 | 1.38 | Liquid control |
| Composition 2 (Comparative) | Lup F + TAC + MTBHQ | 1.1 | 8.54 | 0.87 | 3.58 | 2.74 | Solid control |

TABLE 8-continued

| | | Blend phr | Crosslinking HDPE MDR Rheometer data @ 190° C., 1° arc, 100 cpm frequency | | | Measuring Crosslinking Efficiency (Productivity) | |
|---|---|---|---|---|---|---|---|
| Composition | Generic Description | | MH dN-m | $ts_{0.4}$ min. | $tc_{90}$ min. | Efficiency Factor | % Increase inb Efficiency vs Liquid Composition 1 |
| Composition 6 (Invention) | IP-D16 + Lup F + TAC + MTBHQ | 1.1 | 10.2 | 0.88 | 3.50 | 3.43 | 148% |
| Composition 7 (Invention) | IP-D16 + Lup F + TAC + OHT | 1.1 | 10.1 | 0.90 | 3.50 | 3.50 | 153% |
| Composition 8 (Invention) | IP-D16 + Lup F + TAC + OHT + MTBHQ | 1.1 | 9.7 | 0.95 | 3.70 | 3.35 | 142% |

Example 5

In this example, the $ts_{0.4}$ scorch time performance at 162° C., the approximate temperature where the HDPE exhibits initial melting and flow within the mold, was evaluated. This 162° C. temperature is not a cure temperature, but more of a processing or flow temperature. In rotational molding, HDPE melt flow can be very important depending upon the mold design and part thickness.

The performance of Composition 9 (containing both "unsaturated" peroxide IPD-16 and "saturated" organic peroxide D-16) was compared to that of a peroxide composition containing only "saturated" organic peroxide (Composition 10). Table 9 sets forth the components of Compositions 9 and 10. In each case, the "saturated" Lup F peroxide was used along with TAC and MTBHQ.

As shown in Table 10, Composition 9 (in accordance with the present invention) provided a significantly longer $ts_{0.4}$ scorch time and a longer $ts_1$ scorch time, as compared to Composition 10 (containing only "saturated" organic peroxides).

In noted in Table 9, more of Composition 9 was used due to the higher molecular weight of IP-D16 peroxide as compared to D16 peroxide. Furthermore, in Composition 9, less MTBHQ additive was used versus Composition 10. Yet, unexpectedly, the peroxide composition in accordance with the present invention (Composition 9) provided a significantly longer 32% increase in $ts_1$ scorch time at 162° C., thus more improved flow time before the crosslinking cure cycle begins.

Although this test did not result in a complete cure, it was observed that the MDR partially cured part prepared using the comparative Composition 10 blend had a noticeably stronger, less pleasant odor than the part obtained using the inventive Composition 9 blend.

TABLE 9

Organic Peroxide Compositions

| Composition | IP-D16 | D-16 | Lup F | TAC | MTBHQ |
|---|---|---|---|---|---|
| Composition 10 (Comparative) | 0% | 23% | 26% | 47.5% | 3.5% |
| Composition 9 (Invention) | 28.74 | 0% | 24.07 | 43.98 | 3.24% |

TABLE 10

Melt Flow Study of HDPE Containing Organic Peroxide Curatives
MDR Scorch Time ($ts_{0.4}$ & $ts_1$) data at 162° C.

| Composition | phr | $ts_{0.4}$ min. | $tc_{90}$ min. |
|---|---|---|---|
| Composition 10 (Comparative) | 0.906 | 6.50 | 8.60 |
| Composition 9 (Invention) | 1.06 | 7.59 | 11.40 |

This example showed the benefits of the organic peroxide compositions in accordance with the present invention. By practice of the invention, it is possible to obtain a longer time to compound HDPE using processing equipment while using less MTBHQ scorch retarder, as well as having the HDPE polymer flow inside the mold for a longer time. Inventive Composition 10 also provides less fugitive organic peroxide decomposition by-products. This helps to eliminate trapped air during the HDPE melting phase in a rotational molding process, while generating less gaseous decomposition by-products. Both features provide effective means of avoiding porosity in the manufacture of crosslinked HPDE parts via rotomolding.

Example 6

This example uses a virgin grade of rotomolding HDPE powder used to make crosslinked HDPE structures and articles for outdoor recreation items such as play sets, canoes and kayaks. In the case of making articles of this nature, crosslinking is important for function, safety, and final esthetics, including odor.

In this example, Composition 11 of the invention is blended with several renewable "outdoors type fragrances" which are bio-based oils (limonene, jasmine oil, rose-floral oils) to impart a pleasant scent to the final HDPE product.

TABLE 11

| Peroxide Composition | Generic Description | Form at 25° C. | MTBHQ | Lup F | IP-D16 | TAC | Sum total |
|---|---|---|---|---|---|---|---|
| Composition 11 (Invention) | Lup F, IP-D16, MTBHQ, TAC | 9% Liquid 5% Solid | 2.5% | 32.0% | 5.50% | 60.0% | 100.0% |

Using 1 phr of peroxide Composition 11 of this invention in HDPE powder, the following oils were used at roughly 0.10 phr.

The general HDPE composition used in the Table 12 MDR crosslinking study is provided below.

100.00 parts virgin HDPE rotational molding powder
        1.00 part Peroxide (Invention) Composition 11 (Table 11)
        0.10 part of bio-based fragrant oil (None, Limonene, Jasmine or Rose)

These novel compositions were cured in the rheometer at 185° C. for 15 minutes at 1 degree of arc and 100 cycles per minute frequency.

TABLE 12

| | | Crosslinking HDPE: MDR Rheometer data @185° C., 1°arc, 100 cpm frequency | | |
|---|---|---|---|---|
| Composition | Generic Description | MH dN-m | Delta $ts_{0.4}$ | $tc_{90}$ min |
| Invention Composition A | Peroxide Invention Composition 11 without Oil | 10.010 | No oil | 4.43 |
| Invention Composition B | Peroxide Invention Composition 11 & Limonene Oil | 9.339 | +0.08 | 5.02 |
| Invention Composition C | Peroxide Invention Composition 11 & Jasmine Oil | 10.098 | +0.06 | 4.69 |
| Invention Composition D | Peroxide Invention Composition 11 & Rose Oil | 9.885 | +0.10 | 4.91 |

The crosslinking results in Table 12 using the peroxide composition 11 of the invention, combined with the various oils show that these oils can be used to provide desirable crosslinking based on the MH torque values with little effect on the final cure time. Such monomeric unsaturated bio-based oils used in the practice of the invention unexpectedly provide good crosslinking performance with Composition 11, and react with the HDPE.

Using a constant 0.1 phr of various oils, the most preferred was Jasmine Oil (Composition C) as it provided the highest MU crosslink density. It was unexpectedly slightly higher than the MH from Composition A. Composition C also had the least effect on the $tc_{90}$ cure time. It also had a 0.06 min longer $ts_{0.4}$ scorch time, thus more desirable versus the Composition A with no oil.

The cured HDPE samples made with Compositions B, C and D all had a slight pleasant odor. The use of these novel compositions may be desirable for a manufacturing plant creating a more pleasant work environment. The odor is fresh and clean from all three crosslinked parts that contained the bio-based oils, also referred to as free-radically reactive unsaturated deodorant compounds.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as to fall within the spirit and scope of the invention.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the curable composition or process. Additionally, in some embodiments, the invention can be construed as excluding any element or process step not specified herein.

What is claimed is:

1. An organic peroxide composition comprising (i) at least one monomeric ethylenically unsaturated organic peroxide in an amount of 0.5%-30% by weight, (ii) at least one saturated organic peroxide in an amount of 15%-40% by weight, (iii) at least one free radically-reactive mono- or poly-unsaturated compound, other than said ethylenically unsaturated organic peroxide, in an amount of 35%-70% by weight, that contains at least one carbon-carbon double bond, and (iv) at least one free radical trap compound in an amount of 1%-10% by weight; wherein the weight ratio of ethylenically unsaturated organic peroxide to saturated organic peroxide is from 0.5:9.5 to 9.5:0.5.

2. The organic peroxide composition according to claim 1, wherein the at least one ethylenically unsaturated organic peroxide comprises at least one dialkyl peroxide.

3. The organic peroxide composition according to claim 1, wherein the at least one ethylenically unsaturated organic peroxide comprises at least one ethylenically unsaturated organic peroxide comprising at least one moiety selected from the group consisting of isopropenyl moieties, (meth) acrylate moieties, fumarate moieties, maleate moieties, and itaconate moieties.

4. The organic peroxide composition according to claim 1 where the at least one free radically-reactive mono- or poly-unsaturated compound is selected from the group consisting of deodorant compounds and crosslinking coagents.

5. The organic peroxide composition according to claim 1, wherein the at least one free radical trap compound is selected from the group consisting of nitroxides, quinone compounds, hindered phenol antioxidant radical scavengers, bioflavonoids, and combinations thereof.

6. The organic peroxide composition, according to claim 1, wherein the at least one free-radically reactive mono or poly-unsaturated compound is selected from the group consisting of alpha-pinene, beta-pinene, eugenol, limonene, jasmonic acid, orange oil, unsaturated components of orange, unsaturated components of lemon oil, unsaturated components of jasmine oil, unsaturated components of rose oil, unsaturated components of lilac oil, unsaturated components of violet oil, unsaturated components of clove oil, unsaturated components of hyacinth oil, unsaturated components of lily oil, triallyl cyanurate, triallyl isocyanurate, and combinations thereof.

7. The organic peroxide composition according to claim 1, wherein the at least one saturated organic peroxide is selected from the group consisting of saturated dialkyl peroxides, saturated endo peroxides, and combinations thereof.

8. The organic peroxide composition according to claim 7, wherein the saturated organic peroxide is an aryl-containing dialkyl peroxide.

9. The organic peroxide composition according to claim 1, wherein the organic peroxide composition is liquid or a mixture of liquid and solid at 25° C. to 35° C. or a low melting solid having a melting point less than or equal to 35° C.

10. The organic peroxide composition according to claim 1, wherein the at least one ethylenically unsaturated organic peroxide comprises at least one ethylenically unsaturated organic peroxide containing at least one isopropenyl group attached to an aromatic ring.

11. The organic peroxide composition according to claim 1, wherein the organic peroxide composition is a liquid or a mixture of liquid and solid at 25° C. to 35° C. or a low melting solid having a melting point less than or equal to 35° C. and the at least one or more ethylenically unsaturated organic peroxides comprise 1-(2-tert-butylperoxyisopropyl)-3-isopropenylbenzene, the at least one saturated organic peroxides is selected from the group consisting of m/p-di(t-butylperoxy)diisopropylbenzene, t-butylcumyl peroxide, 2,5-dimethyl-2,5-di(t-butylperoxy)hexane and combinations thereof, the at least one free radical trap compound is selected from the group consisting of 4-hydroxy TEMPO, mono-tert-butyl hydroquinone (MTBHQ) and HQMME (hydroquinone, monomethylether) and combinations thereof, and the at least one free radically-reactive mono- or poly-unsaturated compound is selected from the group consisting of alpha-pinene, beta-pinene, eugenol, limonene, jasmonic acid, triallyl cyanurate, triallyl isocyanurate, orange oil components, lemon oil components, jasmine oil, components, rose oil, and combinations thereof.

12. The organic peroxide composition according to claim 11, wherein the organic peroxide composition is a liquid a mixture of liquid and solid at 25° C. to 35° C. or a low melting solid having a melting point less than or equal to 35° C., the one or more ethylenically unsaturated organic peroxides comprise 1-(2-tert-butylperoxyisopropyl)-3-isopropenylbenzene, the one or more saturated organic peroxides comprise m/p-di(t-butylperoxy)diisopropyl-benzene, the one or more free radical traps comprise mono-tert-butyl hydroquinone (MTBHQ), and the one or more mono- or poly-unsaturated compounds comprise triallyl cyanurate.

13. A method of forming a crosslinked polymer comprising processing a polymer or polymer precursor in the presence of the organic peroxide composition of claim 1 to form the crosslinked polymer.

14. The method of forming a crosslinked polymer according to claim 13, wherein the crosslinked polymer is crosslinked polyethylene.

15. The method of forming a crosslinked polymer according to claim 14, wherein the crosslinked polyethylene is selected from the group consisting of crosslinked high density polyethylene (HDPE), crosslinked medium density (MDPE), crosslinked low density polyethylene (LDPE), crosslinked linear low density polyethylene (LLDPE), crosslinked polyethylene blends, crosslinked polyethylene copolymers, crosslinked polyethylene terpolymers and combinations thereof.

16. The method of forming a crosslinked polymer according to claim 13, wherein the processing comprises a rotomolding process.

17. The method of forming a crosslinked polymer according to claim 13, wherein a monomeric portion of the at least one ethylenically unsaturated organic peroxide is incorporated into the crosslinked polymer.

\* \* \* \* \*